United States Patent
Milton

[11] 3,933,410
[45] Jan. 20, 1976

[54] OPTICAL CONNECTOR WITH SINGLE SCRAMBLING VOLUME

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,537

[52] U.S. Cl............................................. 350/96 C
[51] Int. Cl.².......................................... G02B 5/16
[58] Field of Search .................... 350/96 C, 96 WG

[56] References Cited
UNITED STATES PATENTS

| | | | |
|---|---|---|---|
| 3,809,686 | 5/1974 | Chandross et al. | 350/96 C X |
| 3,833,284 | 9/1974 | Kaminow et al. | 350/96 C X |
| 3,856,127 | 12/1974 | Halfon et al. | 350/96 C X |
| 3,883,217 | 5/1975 | Love et al. | 350/96 WG X |

*Primary Examiner*—Archie R. Borchelt
*Attorney, Agent, or Firm*—R. S. Sciascia; Arthur L. Branning; M. L. Crane

[57] ABSTRACT

An optical connector to provide input-output coupling to an optical transmission line without interrupting completely the flow of optical radiation. An optically transparent dielectric block is inserted between portions of a fiber bundle transmission line. The block has one flat side along its length which is bonded to a second material having at least one flat side along its length cooperating with the flat side of the block. The input-output bundles are attached to the second material which has the same index of refraction as the first block.

4 Claims, 7 Drawing Figures

OPTICAL CONNECTOR WITH SINGLE SCRAMBLING VOLUME

BACKGROUND OF THE INVENTION

This invention is directed to optical connectors in an optical transmission line and more particularly to an optical connector which permits input of radiation into a main line and output of radiation from a main transmission line without any loss of radiation.

Heretofore optical fiber bundles have been used for transmitting light from one place to another. Straight-through couplings have been used which permit coupling two optical fiber bundles together without any light loss between the bundle paths. There is a need for coupling light into and from an optical transmission line without interrupting the flow of transmission. Such lines may be used for communications, as well as other purposes.

Application Ser. No. 395,679 filed 10 Sept. 1973 is directed to a T coupler for coupling information from and into an optical multimode fiber bundle transmission line. This application is an improvement allowing additional information to be added or removed from an optical multimode fiber bundle transmission line.

SUMMARY OF THE INVENTION

This invention provides an optical connector for connecting two main optical transmission lines together without the loss of any radiation in the coupling. Further, additional means is provided for coupling radiation from the main transmission line to an auxiliary line and to couple radiation from an auxiliary line into the main line. The connector includes a main dielectric rod and an auxiliary dielectric rod connected together with an optical bond index matching epoxy so that radiation will not be reflected at the interface between the main dielectric rod and the auxiliary rod. Thus, radiation may pass freely from one dielectric rod to the other. Therefore radiation may be coupled from the main line to the auxiliary line and vice versa without the loss of any radiation. The medium surrounding the coupler has an index of refraction which is less than that of the coupler material as is well known in the fiber optic bundle art.

DETAILED DESCRIPTION

Figure 1:
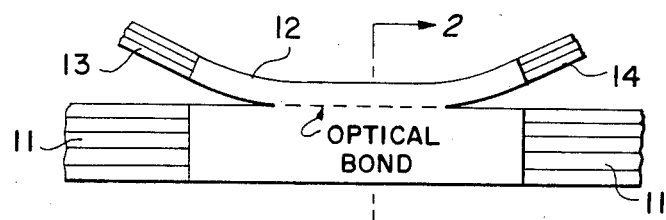
FIG. 1 illustrates a side view of a coupler of this device.
Figure 2:
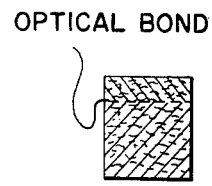
FIG. 2 is a cross sectional view of the device of FIG. 1 across the middle thereof.

Now referring to the drawings where like reference characters refer to like parts, there is shown by illustration in FIG. 1, an optical radiation connector made in accordance with the teaching of this invention. As shown, the device of FIG. 1 includes a main block or rod 10 of optically transparent material having the same cross sectional area as the optical transmission lines 11 between which the rod is inserted. The rod 10 includes an upper flat side surface to which is bonded an auxiliary rod 12 of like material with the same index of refraction (such as PYREX) and cross sectional area at the joint as that of the main rod. The bonding material, such as an epoxy must have the same index of refraction as that of the main and auxiliary rods. The auxiliary rod is shown as having a flat surface that matches that of the main rod, is of a longer length, and bent into a somewhat u-shape.

Single multimode optical fiber bundle transmission lines may be attached to the ends of the main connector in order to optically connect the two main transmission lines together without any undue optical loss. The auxiliary rod may be connected to single or multiple optic fiber bundles 13, 14 as desired.

Figure 3:
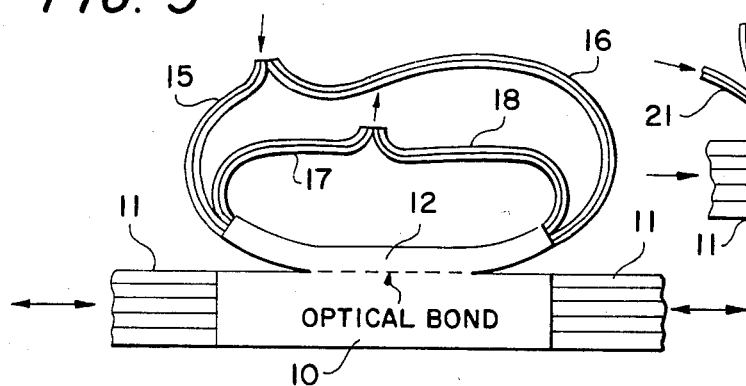
FIGS. 3 and 4 illustrate the connector of FIG. 1 with different auxiliary input and output connections.
Figure 4:
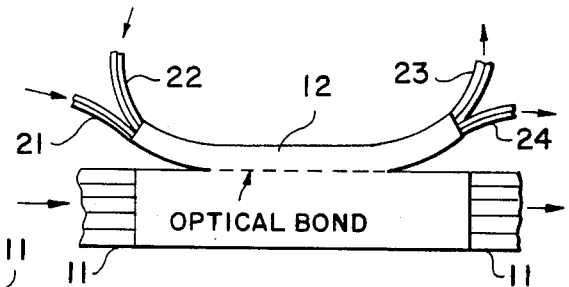

FIGS. 3 and 4 illustrate different arrangements of separate fiber bundle connections. In FIG. 3, auxiliary fiber optic bundles 15, 16 connect with each end of the auxiliary rod and direct radiation into each end. Auxiliary fiber optic bundles 17, 18 also connect to each end of the auxiliary rod and directs radiation from the auxiliary rod. FIG. 4 illustrates more than one fiber optic bundle 21, 22 and 23, 24 connected to each end of the auxiliary rod and directs radiation into one end or out the opposite end.

Figure 5:
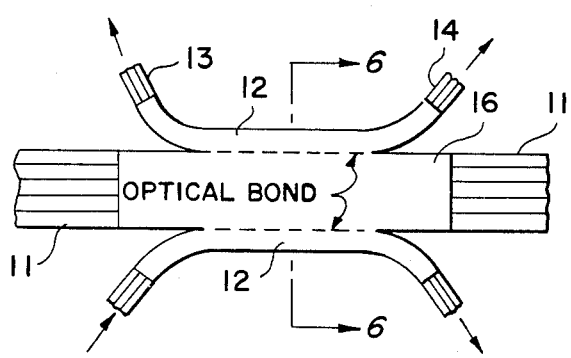
FIG. 5 illustrates a device similar to that of FIG. 1 with two auxiliary dielectric rods connected with the main rod.

FIG. 5 is a modification of the connector device of FIGS. 1–4 and includes a second auxiliary rod 12 on the lower side of the main rod. The lower auxiliary rod is connected the same as the upper rod and operates in the same manner. As shown separate auxiliary fiber optic bundles are connected with each end of each of the auxiliary rods in order to direct radiation into and out of the auxiliary and main rods.

Figure 6:
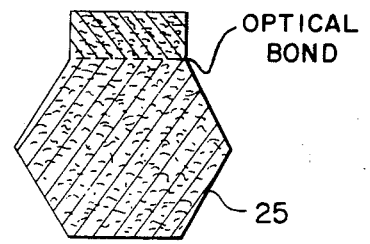
FIG. 6 illustrates a cross sectional view of an auxiliary dielectric rod secured to a hexagon main dielectric rod.

FIG. 6 is a cross sectional view of a main 25 and auxiliary rod 26 in which the main rod has a shape of a hexagon. The modification in FIG. 6 could be modified further by securing an auxiliary rod to each face of the hexagon rod. This modification is shown as a hexagon, but the main rod could have more or less sidefaces and operate substantially the same.

Figure 7:
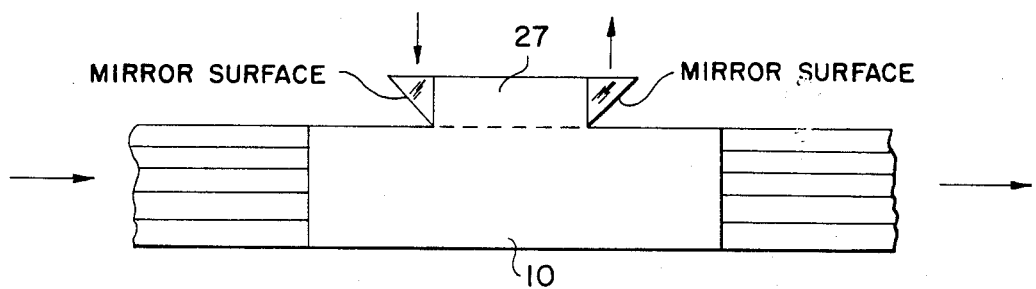
FIG. 7 illustrates a modification of the device of FIG. 1 in which the auxiliary dielectric rod is provided with mirrors on the end.

FIG. 7 illustrates a main rod 10 with an auxiliary rod 27 of shorter length than that of the main rod. The auxiliary rod is provided with mirrored end surfaces 28 which will reflect radiation out from each end depending upon direction of travel of the radiation in the main rod.

In the operation of each of the devices as shown, radiation will be transmitted from one main fiber optic transmission line to the main connector rod, out the main connector rod to the connected main transmission line as well as out the auxiliary rod. If the radiation is bidirectional, the radiation may be directed through the coupler from either end. The arrows illustrated in the various modifications are representative only since the radiation may enter and emerge in directions opposite to the direction of the arrows, as shown.

The connectors shown and described in this application are easily constructed and may be connected to single or multiple fiber optic bundles as desired. If the cross sectional areas are conserved in construction and the numerical aperture of the dielectric rod is equal or greater than the numerical aperture of the fiber used there need be no loss in the device except for the unavoidable single packing fraction loss on re-entering a fiber bundle. In all of the different modifications even with multiple input and output ports, a single dielectric volume serves the scrambling functions so that the connector may be smaller than normally used to connect optical transmission lines together. The main requirement in construction is that the scrambling volume must be long enough to ensure even distribution of the light over the output faces.

Obviously many modification and variations of the present invention are possible in light of the above teachings. It is therefore to be understood that within the scope of the appended claims the invention may be practiced otherwise thas as specifically described.

What is claimed and desired to be secured by letters patent of the United States is:

1. An optical connector for connecting two sections of a main fiber optic bundle transmission line together and for coupling radiation into and out of the main transmission line; which comprises:
   a main optical transmission dielectric rod having ends with a cross sectional area equal to said main transmission lines;
   said dielectric rod including at least one side with a flat surface along a portion of the length thereof;
   an auxiliary dielectric rod having the same index of refraction as said main dielectric rod;
   said auxiliary dielectric rod including a flat side surface and joined with said main dielectric rod along its flat surface in optical alignment therewith;
   whereby said main dielectric rod may be optically connected to said main radiation transmission line and said auxiliary rod may be connected with auxiliary fiber optic bundles.

2. An optical connector as claimed in claim 1, in which
   said connector includes more than one auxiliary dielectric rod secured onto said main dielectric rod.

3. An optical connector as claimed in claim 2, in which;
   said main dielectric rod has the shape of a hexagon.

4. An optical connector as claimed in claim 1, in which;
   said auxillary optical transmission rod include mirrored surfaces at each end, for input and output of radiation into and from said auxiliary rod.

* * * * *